(12) United States Patent
Katsuragawa

(10) Patent No.: US 6,339,588 B1
(45) Date of Patent: Jan. 15, 2002

(54) METHOD AND SYSTEM OF CDMA COMMUNICATION

(75) Inventor: Hiroshi Katsuragawa, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 09/093,387

(22) Filed: Jun. 9, 1998

(51) Int. Cl.$^7$ ................................................. H04Q 7/20
(52) U.S. Cl. ....................... 370/311; 370/335; 455/458; 455/515
(58) Field of Search .................. 370/311, 313, 370/314, 335, 342; 455/458, 466, 38.3, 515

(56) References Cited

U.S. PATENT DOCUMENTS 6,111,865 A * 8/2000 Butler ......................... 370/335

OTHER PUBLICATIONS

Newton, H., 'Newton's Telecom Dictionary', 9th Edition, Flatiron Publishing, Inc., definition of "interleave", p. 607, Sep. 1995.*

* cited by examiner

*Primary Examiner*—Melvin Marcelo
(74) *Attorney, Agent, or Firm*—Venable; Robert J. Frank; Allen Wood

(57) ABSTRACT

In a method of CDMA communication, a page message notice signal is transmitted over a page message notice channel, which is different from paging channels. The page message notice signal indicates whether a monitor-required page message is included in an up-coming time slot assigned to the mobile station

16 Claims, 7 Drawing Sheets

METHOD AND SYSTEM OF CDMA COMMUNICATION

TECHNICAL FIELD OF THE INVENTION

The present invention relates to a method and system of CDMA (Code Division Multiple Access) communication, for example, specified by North America EIA/TIA standard as IS-95.

BACKGROUND OF THE INVENTION

Conventionally, an analog cellular system uses Frequency Division Multiple Access (FDMA), in which FDMA channels are defined by a range of radio frequencies, usually expressed in a number of kilohertz (kHz), out of the radio spectrum. In recent years, digital communication methods, such as TDMA and CDMA, have been used for mobile communication. TDMA (rime Division Multiple Access) communication method is specfied, for example, by North American TIA/EIA standard as IS-136. CDMA (Code Division Multiple Access) communication method is specified, for example, by North American EIA/TIA standard as IS-95. Especially, CDMA communication method is expected to be the most useful and popular method for mobile communication.

The CDMA communication method has many advantages as compared to the conventional analog method, in that the frequencies can be used efficiently. According to the CDMA technique, however, it is difficult for a mobile station to reduce power consumption in an idle state (waiting state). This is because, the mobile station performs many processes in the idle state.

OBJECTS OF THE INVENTION

Accordingly, an object of the invention is to reduce the power consumption of a mobile station.

Additional objects, advantages and novel features of the invention will be set forth in part in the description that follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

According to a first aspect of the invention, in a method of CDMA communication, a page message notice signals transmitted over a page message notice channel that is different from paging channels. The page message notice signal indicates whether a monitor-required page message is included in an up-coming time slot.

In the method of CDMA communication, each mobile station monitors the page message notice channel, and monitors the assigned paging channel only when the page message notice signal indicates that the up-coming time slot includes a monitor-required page message addressed to the mobile station.

According to a second aspect of the invention , a CDMA communication system includes a base station which transmits page messages over a plurality of paging channels, and a page message notice signal over a page message notice channel that is different from the paging channels. The page message notice signal indicates whether a monitor-required page message is included in an up-coming time slot transmitted N slots later than the current time slot. The system also includes mobile stations each of which monitors the page message notice channel, and monitors a certain assigned paging channel only when the page message notice signal indicates that a monitor-required page message is included in the up-coming time slot assigned to the mobile station.

In the CDMA communication system, each mobile station may includes a CPU which processes the page message; a baseband-processing unit which processes the page message notice signal; and a control circuit which controls the CPU and the baseband-processing unit. In this case, the control circuit controls the CPU so that the CPU does not wake up for operation until the page message notice signal indicates that a monitor-required page message is included in the up-coming time slot assigned to the mobile station.

According to a third aspect of the invention, a CDMA transmitter includes a page message generator which generates page messages to be transmitted over a plurality of paging channels. The transmitter also includes a notice signal generator which generates a page message notice signal to be transmitted over a page message notice channel that is different from the paging channels. The page message notice signal indicates whether a monitor-required page message is included in an up-coming time slot transmitted N slots later than the current time slot.

According to a fourth aspect of the invention, a CDMA receiver includes a CPU which processes the page message; a baseband-processing unit which processes the page message notice signal; and a control circuit which controls the CPU and the baseband-processing unit. In the CDMA receiver, the control circuit may control the CPU so that the CPU does not wake up for operation until the page message notice signal indicates that a monitor-required page message is included in the up-coming time slot assigned to the mobile station.

DETAILED DISCLOSURE OF THE INVENTION

Figure 1:
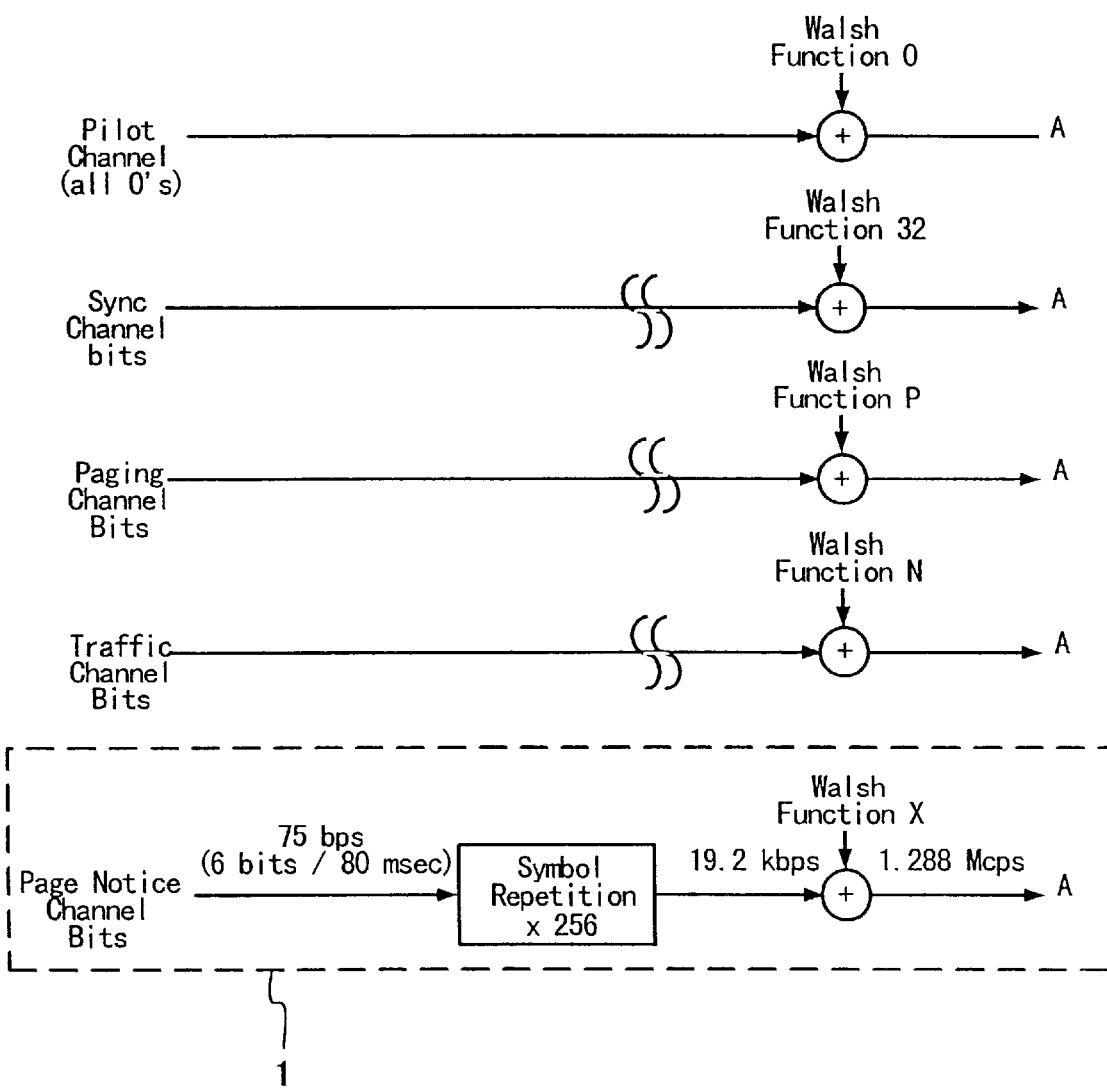
FIG. 1 is a diagram showing the forward channel structure of a CDMA communication system, according to a first preferred embodiment of the invention.

For a better understanding of the invention, the background technology will first be described. In a mobile communication system, a base station transmits paging channels to mobile stations. The paging channel is used to send control information to mobile stations that have not been assigned to a traffic channel. The base station divides each paging channel into a plurality of time slots. Each time slot contains page messages for mobile stations, specified by IDs, such as telephone numbers. The mobile stations monitors only time slots assigned thereto. In other words, the mobile station does not monitor the paging channel during the other time slots, which are not assigned thereto. During time intervals when the mobile station is not monitoring the paging channel, the mobile station is in a so-called SLEEP mode. The sleep mode can be called a low power consumption mode.

Section 6.6.2.1 of TIA/EIA/IS-95 describes the specification of the intermittent receiving operation in CDMA systems. According to the specification, the paging channel of 163.84 seconds is divided into 2048 time slots of 80 ms. The fame slots are assigned with slot numbers (SLOT_NUM) of 0 to 2047. The base station transmits information of SLOT_CYCLE_INDEX, specifying the cycle of intermittent receiving operation, to the mobile stations. Page slot numbers (PGSLOT) of 0 to 2047 are assigned to the mobile stations. Each mobile station only monitors time slots that satisfy the following condition:

$$(SLOT\_NUM - PGSLOT) \bmod (16 \times 2^{SLOT\_CYCLE\_INDEX}) = 0$$

For example, when SLOT_CYCLE_INDEX equals zero, the intermittent receiving operation is carried out every 16 slots. When PGSLOT of the mobile station is six, the mobile station monitors the time slots having SLOT_NUM of 6, 22, 38, . . . , 2038.

According to the CDMA systems using the above-described intermittent receiving operation, it is difficult to reduce power consumption of the mobile stations in the idle state. That is because, the procedure in the mobile station are complicated when receiving the page message from the base station. The mobile station is equipped with complicated circuitry for a baseband reception, such as despread (reverse spread) spectrum processing. In other words, the mobile station operates with full power in the idle state to receive the page message in the same manner as in the talking mode (intercommunication mode).

In addition, it is difficult to shorten the time for receiving the page message (IDLE time), because the communication manner is complicated The base station interleaves the page message every 20 ms, and performs convolutional coding. The mobile station deinterleaves (reverse interleave) the transmitted page message and performs Viterbi-demodulation of the convolution code. As there is time delay in algorithm for the de-interleave and Viterbi-demodulation processing, the receiving operation must be started at least 40 ms in advance.

According to section 6.6.2.1.1 of IS-95, the page message includes Slotted Page Message, which contains a field called MORE_PAGES. The field of MORE_PAGES indicates whether more messages (monitor-required messages) are included in the current time slot. In more detail, MORE_PAGES indicates that the remainder of the slot will contain no more messages addressed to that mobile station, when the field is set to "0". This allows a mobile station operating in the slotted mode to stop monitoring the paging channel as soon as possible.

When the mobile station receives MORE_PAGES indicating that no more messages are included in the current time slot, the mobile station stops the receiving operation and gets in SLEEP mode. If, for example, Slotted Page Message is included in the first 20 ms of the time slot, the mobile station does not have to perform the receiving operation in the remaining 60 ms. As Slotted Page Message is, however, transmitted in accordance with the above-described manner for the paging channel the mobile station spends at least 60 ms to receive Slotted Page Message.

In most cases, a page message is not included in the time slots. This means that the mobile station uselessly performs CDMA receiving operation at least or 60 ms to obtain information indicating no message is exiting in the assigned time slot. As the period of 60 ms is calculated based on the condition in that devices in the mobile station, such as a CPU and a DSP, operate at its maximum rate, the CDMA receiving time may be longer than 60 ms in practice.

The present invention is directed to decreasing the frequency of the CDMA receiving operation by mobile stations to reduce power consumption of the mobile stations.

OVERVIEW OF THE INVENTION

According to section 7.1.3.1 of IS-95, the forwarding channel consist of sixty-four channels, as shown in Table 1:

TABLE 1

| CH | Title | Use |
|---|---|---|
| 0 | Pilot Channel | For Synchronization |
| 1 | Paging Channel | For transmitting the common system information to all mobile stations |
| 2–7 | Paging Channel | For transmitting page messages, etc. to specified mobile stations |
| 32 | Sync Channel | For transmitting information regarding the paging channel |
| Others | Traffic Channel | For transmitting talk (voice) messages |

As shown in Table 1, the forward CDMA channel consists of the following code channels: the pilot channel, one sync channel seven paging channels, and a number of forward traffic channels. Each of these code channels is orthogonally spread by the appropriate Walsh function and is then spread by a quadrature pair of PN sequences at a fixed chip rate of 1.2288 Mcps (million chips/sec). Multiple forward CDMA channels may be used within the base station in a frequency division multiplexed manner.

Page messages for the mobile station are only transmitted over the assigned paging channel, defined by channels 2 to 7. In addition, the page messages are transmitted only in the mobile station's assigned time slots. The paging channel and time lots are defined by the mobile station's ID, such as its telephone number.

In the present invention, one channel is picked up from the traffic channels as a page message notice channel (X), over which a page message notice signal is transmitted. The page message notice signal indicates whether a message (monitor-required message) addressed to the mobile station is included in an up-coming time slot assigned to the mobile station.

FIRST PREFERRED EMBODIMENT

FIG. 1 shows the forward channel structure of a CDMA communication system according to a first preferred embodiment. The forward channel structure is shown comparing to FIG. 7.1.3.1.1 of IS-95.

In this embodiment, one channel is selected from the traffic channels as the page message notice channel (X). The page message notice channel (X) runs at 75 bps, so that each time slot of 80 ms includes six-bit information (page message notice signal) for the six paging channels (2–7). Each bit in the page message notice signal is hereinafter called "notice information bit", so that the notice information bit indicates for each paging channel whether a monitor-required page message is included in an up-coming time slot assigned to the mobile station.

In a notice signal generator 1, the notice information bit is generated by repeating base information 256 times to make a signal of 19.2 kbps. For generating the notice information bit, neither convolution coding nor interleave processing is performed. The signal of 19.2 kbps is spread by Walsh function "X" to generate a signal of 1.288 Mcps to be transmitted to the mobile stations.

Figure 2:
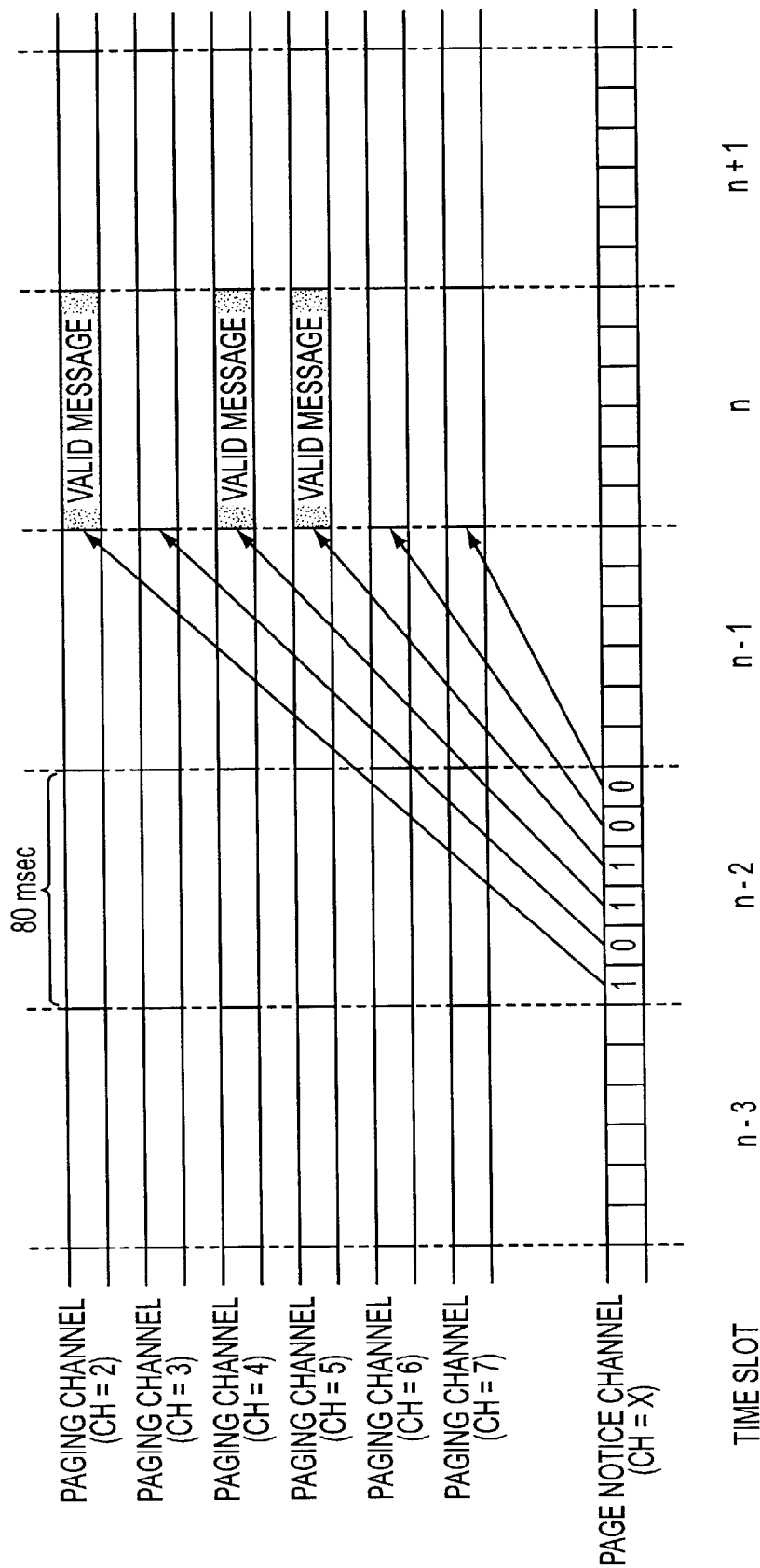
FIG. 2 is a timing chart showing the operation of the first preferred embodiment.

FIG. 2 shows the operation of the first preferred embodiment. In the page message notice channel (CH=X), each bit (notice information bit) indicates whether a monitor-required message is included in an up-coming time slot transmitted N slots later than the current time slot. In this embodiment, "N" is set to two, that is, the page message notice signal is transmitted two slots prior (n−2) to the mobile station's assigned time slot (n).

The base station transmits the page message notice signal of "101100", indicating that monitor-required messages are included in time slots "n" of the paging channels CH2, CH4 and CH5. For each of the paging channels CH2, CH4 and CH5, at least one mobile station, to which the time slot "n" is assigned, is expecting to receive a page message (valid message). The page message notice signal of "101100", also indicates that monitor-required messages are not included in time slots "n" for any of the paging channels CH3, CH6 and CH7.

The page message notice signal "101100" is generated based on the situation in that each Slotted Page Message of the paging channels CH3, CH6 and CH7 includes MORE_PAGES field of zero; and each Slotted Page Message of the paging channels CH2, CH4 and CH5 includes MORE_PAGES field of one.

In this embodiment, each mobile station only monitors the page message notice channel (CH=X) until its notice information bit indicates that a monitor-required message is included in the time slot (n). If the notice information bit indicates that a monitor-required page message is included in the mobile station's assigned time slot (n), which is coming up two slots later, the mobile station receives the assigned paging channel.

As information contained in the paging channels is defined as a Call-Processing message, the information must be processed by the layer-two or higher in the mobile station. Therefore, in the idle state, a CPU wakes up and operates to perform Call Processing for the page message.

In contrast, according to the first preferred embodiment, the page message notice signal can be detected by the layer-one in the mobile station; and therefore, only a digital baseband-processing unit is required to wake up and operates, but the CPU can keep being in SLEEP mode. The digital baseband-processing unit includes a DSP (Digital Signal Processor), ASIC, etc. If the baseband-processing unit detects that the notice information bit in the page message notice signal is one, the CPU wakes up for CDMA receiving operation.

The page message notice signal (notice information bit) is generated in the base station only by spreading, so that all the mobile station has to do is despreading the notice information bit and repeating the symbol 256 times to reproduce the original information. That is, the mobile station is required to perform neither Viterbi-demodulation nor deinterleave processing. Each mobile station is only required to monitor one bit over six bits of the page message notice signal in 80 ms time slot, so that the baseband-processing unit wakes up for operation only during 13.33 ms (=80 ms/6) for each cycle.

Figure 3:
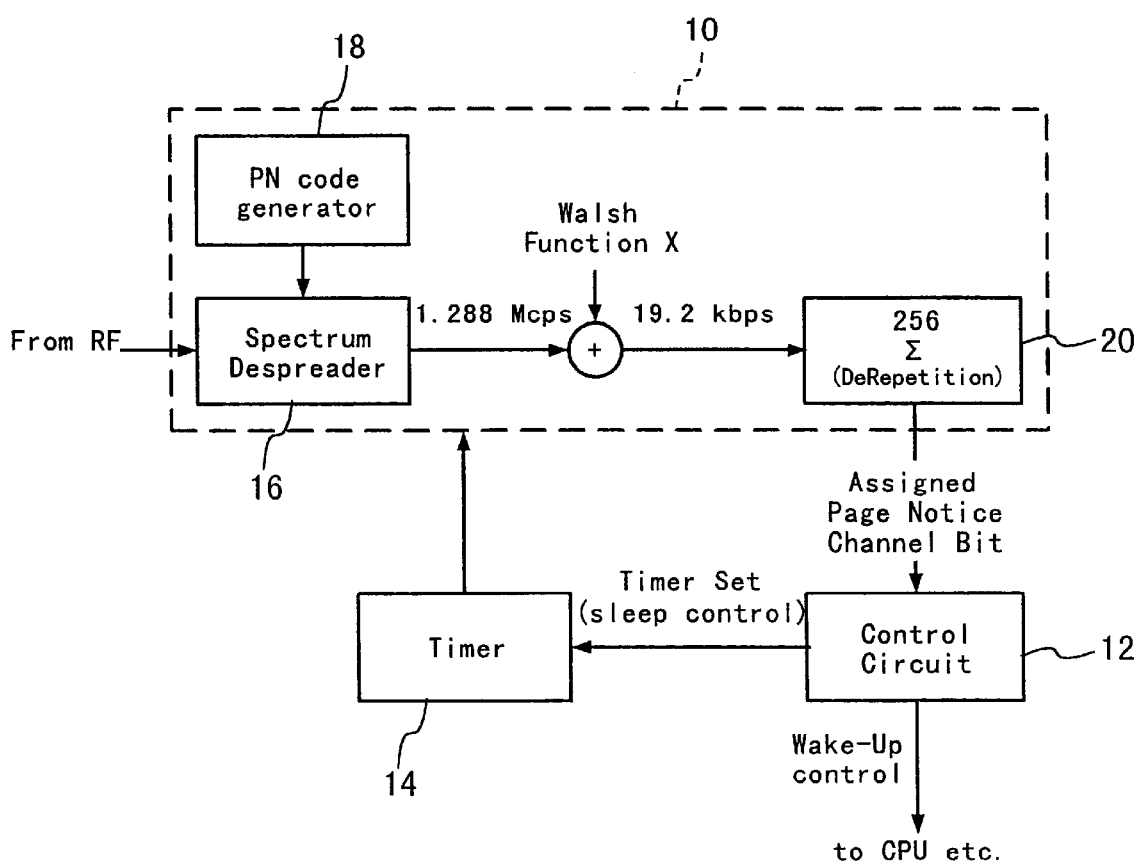
FIG. 3 is a block diagram illustrating a CDMA receiver used in the first preferred embodiment.

FIG. 3 shows a CDMA receiver used in the first preferred embodiment. The CDMA receiver includes a baseband-processing unit 10, a control circuit 12 connected to the baseband-processing unit 10 and a CPU (not shown), and a timer 14 connected to the control circuit 12 and the baseband-processing unit 10. The baseband-processing unit 10 includes a spectrum despreader 16, a PN code generator 18 and a derepetition circuit 20.

The baseband-processing unit 10 performs receiving operation of the page message notice channel (CH=X) only during the period of 13.3 ms in which the notice information bit assigned thereto is being transmitted N slots prior to the mobile stations assigned slot in the paging channel. The spectrum despreader 16 despreads the notice information bit by a PN code. The despread signal is again despread by Walsh function X to generate a signal of 19.2 kbps. The 19.2 kbps signal is integrated by 256 times to reproduce the original bit (notice information bit) of 75 bps.

The control circuit 12 determines whether the notice information bit is zero or one. When the control circuit 12 determines the notice information bit is one, the control circuit 12 wakes up the CPU, etc. On the other hand, when the control circuit 12 determines that the notice information bit is zero, the control circuit 12 does not wake up the CPU, etc., but performs SLEEP processing, such as setting the timer to a predetermined value. The control circuit 12 makes the baseband-processing unit 10 to be in SLEEP mode until the next notice information bit is transmitted.

SECOND PREFERRED EMBODIMENT

Figure 4:
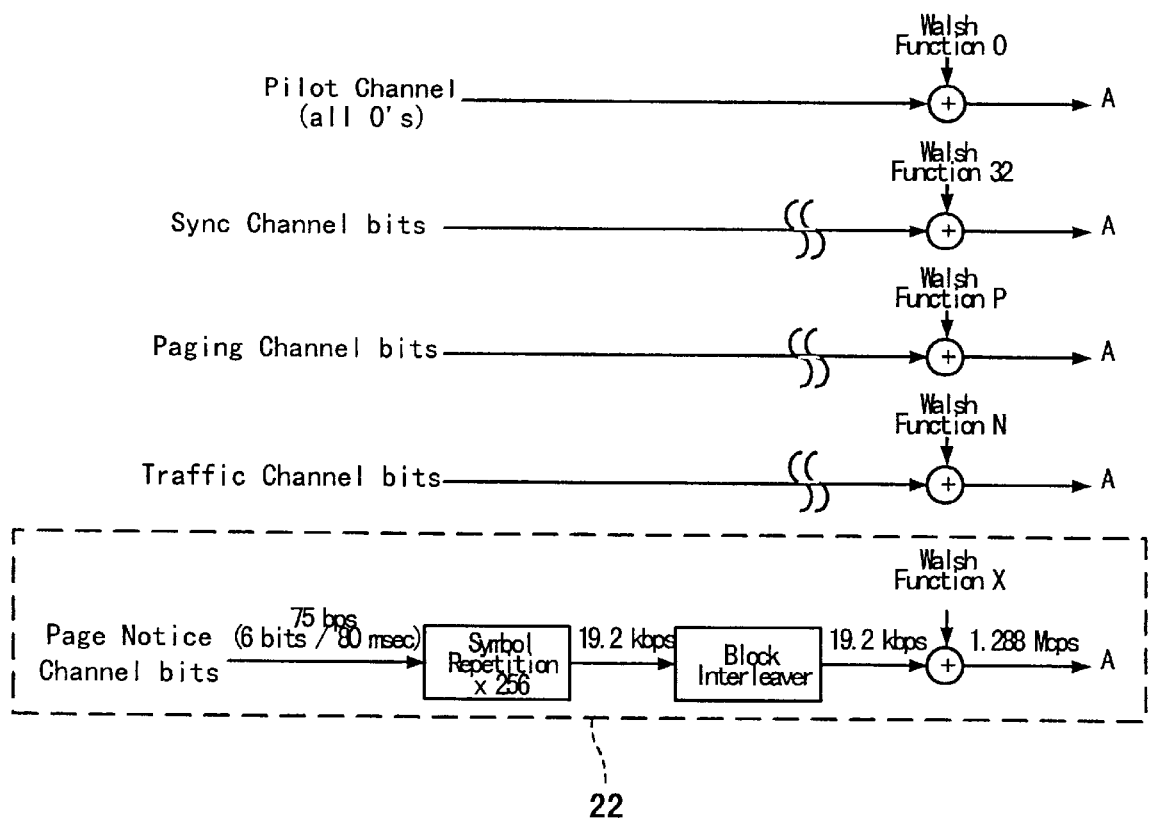
FIG. 4 is a diagram showing the forward channel structure of a CDMA communication system, according to a second preferred embodiment of the invention.

FIG. 4 shows the forward channel structure of a CDMA communication system according to a second preferred embodiment of the invention. In this embodiment, the same and corresponding components and processing to the fast preferred embodiment are not described again to avoid redundant description. The second preferred embodiment, shown in FIG. 4, is formed by adding an interleave circuit to the first preferred embodiment, shown in FIG. 1. That is, in the second preferred embodiment, the page message notice channel (CH=X) is interleaved in a CDMA base station. In response to the interleave processing, the period in which the mobile station performs receiving operation extends from 13.33 ms to 80 ms. Instead, the resistance of the system to transmission noise, such as fading and burst noise, is improved.

In a notice signal generator 22 of the base station, the notice information bit is generated by repeating base information 256 times to make a signal of 19.2 kbps. For generating the notice information bit, neither convolution coding nor interleave processing is performed. The signal of 19.2 kbps is interleaved then spread by Walsh function "X" to generate a signal of 1.288 Mcps.

THIRD PREFERRED EMBODIMENT

Mobile stations designed in accordance with IS-95 may have two types of IDs, MIN (Mobile Identification Number) and IMSI (International Mobile Station Identity). The IMSI used for CDMA communication is classified by class 0 and class 1. The page message includes General Page Message, containing two-bit fields of CLASS_0_DONE and CLASS_1_ONE. CLASS_0_DONE and CLASS_1_DONE indicate whether mobile stations of class 0 and class 1 are required to receive any messages other than General Page Message, respectively. The third preferred embodiment is designed focusing on the two-bit information of CLASS_0_DONE and CLASS_1_DONE. In other words, page message notice signals are transmitted over the page message notice channel (CH=X) to the mobile stations for each class.

Figure 5:
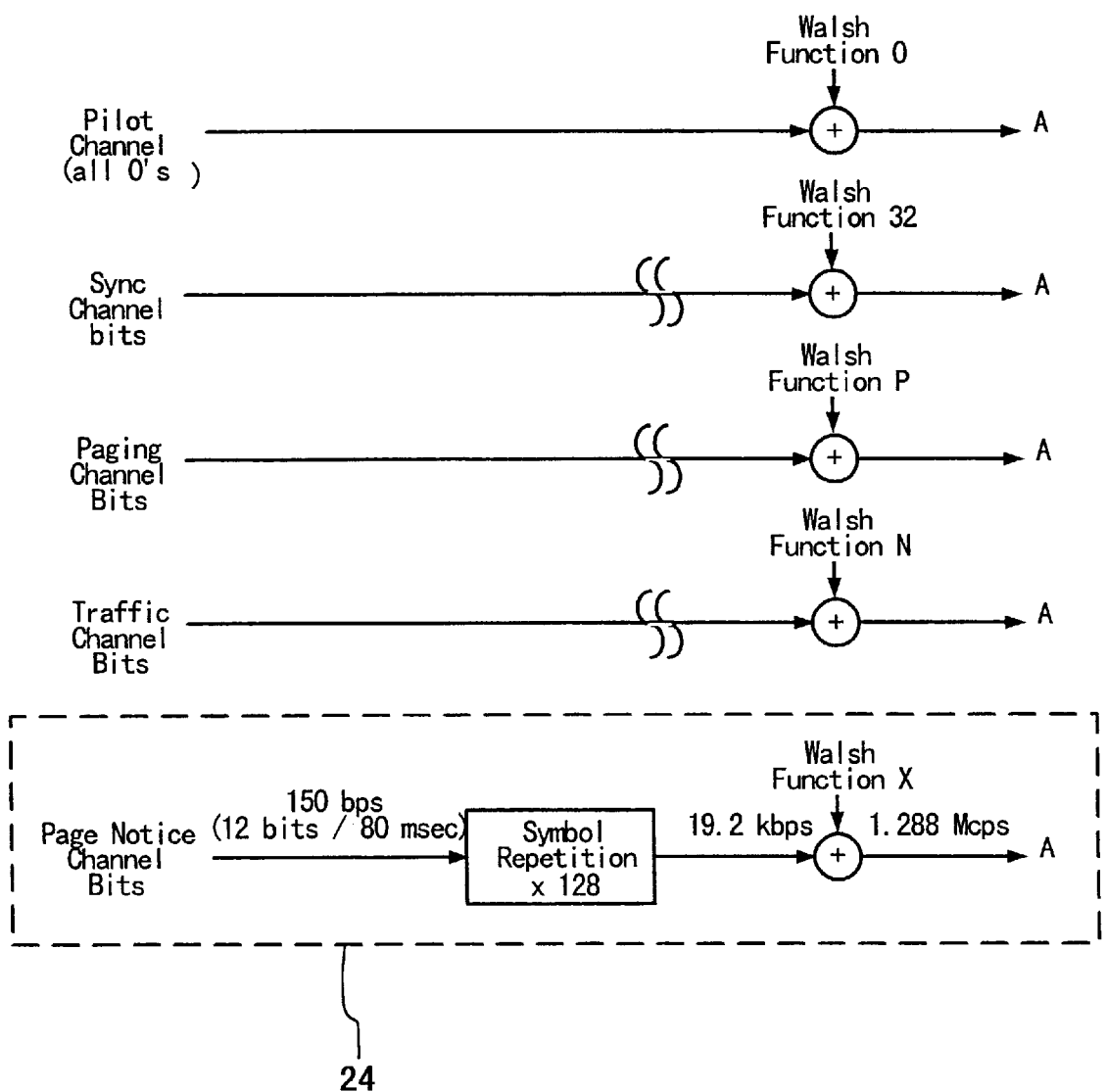
FIG. 5 is a diagram showing the forward channel of a CDMA communication system, according to a third preferred embodiment of the invention.

FIG. 5 shows the forward channel structure of a CDMA communication system according to the third preferred embodiment. In this embodiment, the same and corresponding components and processing to the first preferred embodiment are not described again to avoid redundant description.

The base station determines if monitor-required messages are included in an up-coming time slot (n) transmitted two slots later than the current slot. The determination is performed for each class. The base station generates two-bit information (notice information) for each paging channel. If the system uses six paging channels, the notice information would be twelve bits per time slot of 80 ms.

Based on the twelve-bit information, a notice signal generator 24 in the base station generates a signal of 150 bps, and repeats the signal 128 times to generate a 19.2 kbps signal. The notice signal generator spreads the 19.2 kbps signal by Walsh function X to generate a signal of 1.2288 Mcps. The 1.2288 Mcps signal is combined with signals of other channels, and is spread by PN code.

According to the third preferred embodiment, the mobile station monitors the page message notice channel (CH=X) only during the period of 6.67 ms (=80 ms/12). In the case where messages for class 0 are included in the time slot (n) but no message for class 1 is included therein, the mobile stations having IDs of class 1 do not have to wake up. When simply calculating, according to the third preferred embodiment, the frequency of CPU's operation becomes half of the first preferred embodiment. To improve the transmission quality, interleave processing may be performed in the base station, in the same manner as the second preferred embodiment.

FOURTH PREFERRED EMBODIMENT

As mentioned before, mobile stations designed in accordance with IS-95 may have two types of IDs, MIN (Mobile Identification Number) and IMSI (International Mobile Station Identity). In a fourth preferred embodiment, a page message notice signal is generated based on a part or the whole of the mobile stations IDs. The mobile station whose ID is not identical to ID contained in the page message note signal keeps staying in SLEEP mode, but does not have to wake up for operation.

In this embodiment, two numerals of the eleventh and twelfth figures of IMSI, described in section 6.3.1 and 6.3.1.2 of IS-95, are used as seven-bit code of IMSI_11_12. The page message notice signal includes different information in the following cases:

(1) No message is addressed to any of the mobile stations.

(2) Message is addressed to one of the mobile station.

(3) Messages are addressed to plural mobile stations.

In the case (2), the base station transmits the page message notice signal including the seven-bit data of IMSI_11_12 corresponding to the addressed mobile station.

In practice, the base station transmits the page message notice signal of eight bits over the page message notice channel (CH=X) to the mobile stations as follows:

TABLE 2

| | | Notice Information Bit (8 bits) | |
|---|---|---|---|
| | | Field 1 (1 bit) | Field 2 (7 bits) |
| (1) | No message is addressed to any of the mobile stations | 0 | Random Number of IMSI$_{13}$ 11_12, "00" to "99" |
| (2) | Message is addressed to one of the mobile stations | 1 | IMSI_11_12 for the Mobile Station |
| (3) | Messages are addressed to plural mobile stations | 1 | IMSI_11_12 that is not in Numbers of "00" to "99" |

TABLE 2-continued

As shown in Table 2, Field 1 contains one bit information indicating whether a monitor-required message will be addressed to none of the mobile stations or to at least one mobile station. Field 2 contains seven-bit information corresponding to IMSI_11_12.

In the case (1), the base station sets Field 1 and Field 2 to zero and a random number of IMSI_11_2 corresponding to one of "00" to "99", respectively, to form a notice information bit. In the case (1), even though Field 1 is mistakenly set to one with some transmission errors, 99% of mobile stations do not have to wake up uselessly.

In Field 2, IMSI_11_12 can indicate one hundred numbers "00" to "99", although 128 numbers can be formed by seven-bit data. In the case (2), the base station sets Field 2 to one of twenty-eight numbers that are different from "00" to "99".

Figure 6:
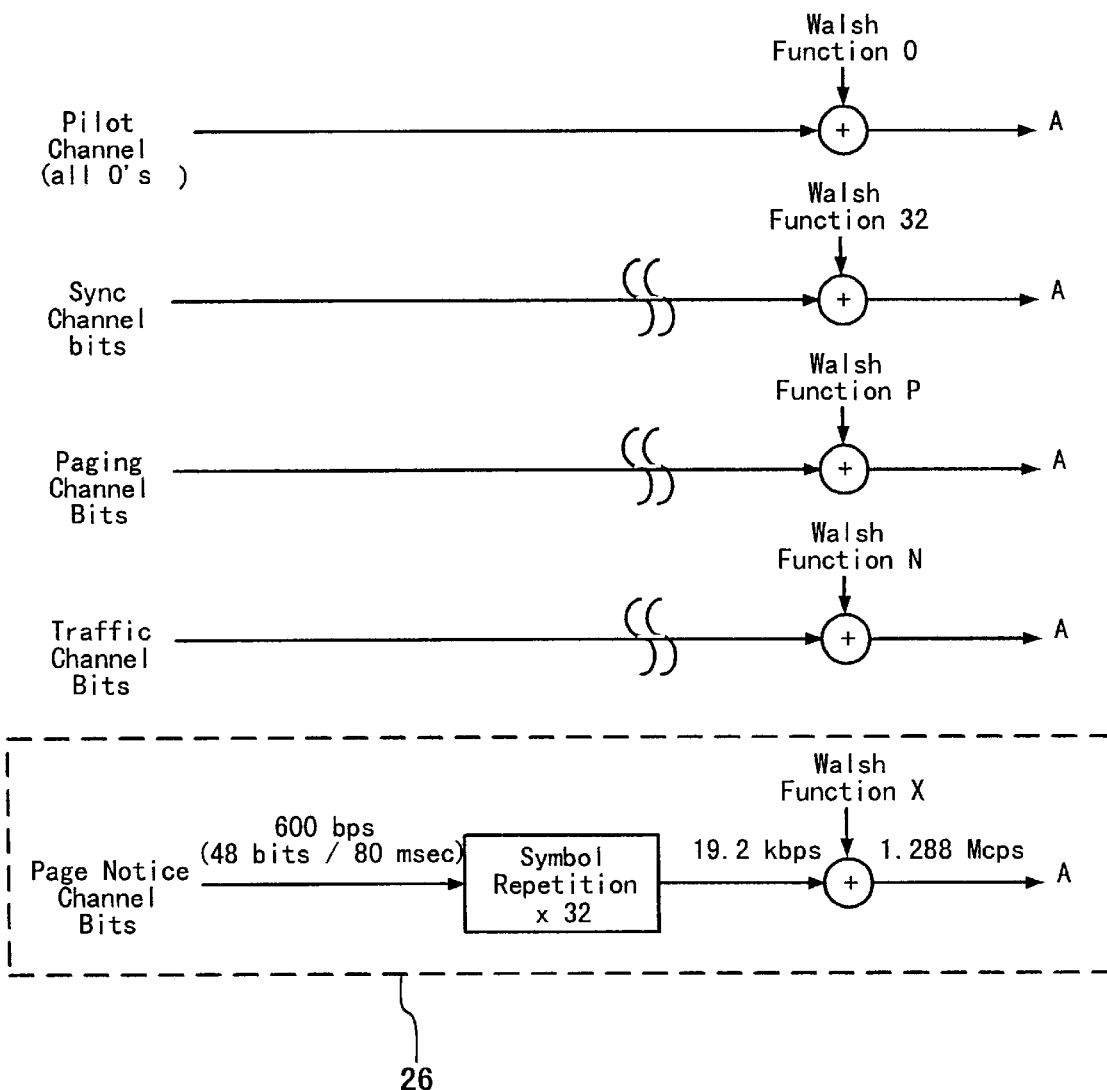
FIG. 6 is a diagram showing the forward channel structure of a CDMA communication system, according to a fourth preferred embodiment of the invention.

FIG. 6 shows the forward channel structure of a CDMA communication system according to the fourth preferred embodiment. In this embodiment, the same and corresponding components and processing to the first preferred embodiment are not described again to avoid redundant description.

The base station determines for each paging channel which case out of the above-described cases (1), (2) and (3) the time slot (n) is existing in, then generates the notice information of eight bits in accordance with Table 2. If six paging channels are used, the notice information is formed by forty-eight bits (6×8=48).

A notice signal generator 26 in the base station generates a 600 bps signal based on the forty-eight bits of the notice information, and repeats the symbol thirty-two times to make a 19.2 kbps signal. The notice signal generator spreads the 19.2 kbps signal by Walsh function X to generate a 1.2288 Mcps signal. The 1.2288 Mcps signal is combined with the other signals and spread by a PN code to make a transmission signal.

Figure 7:
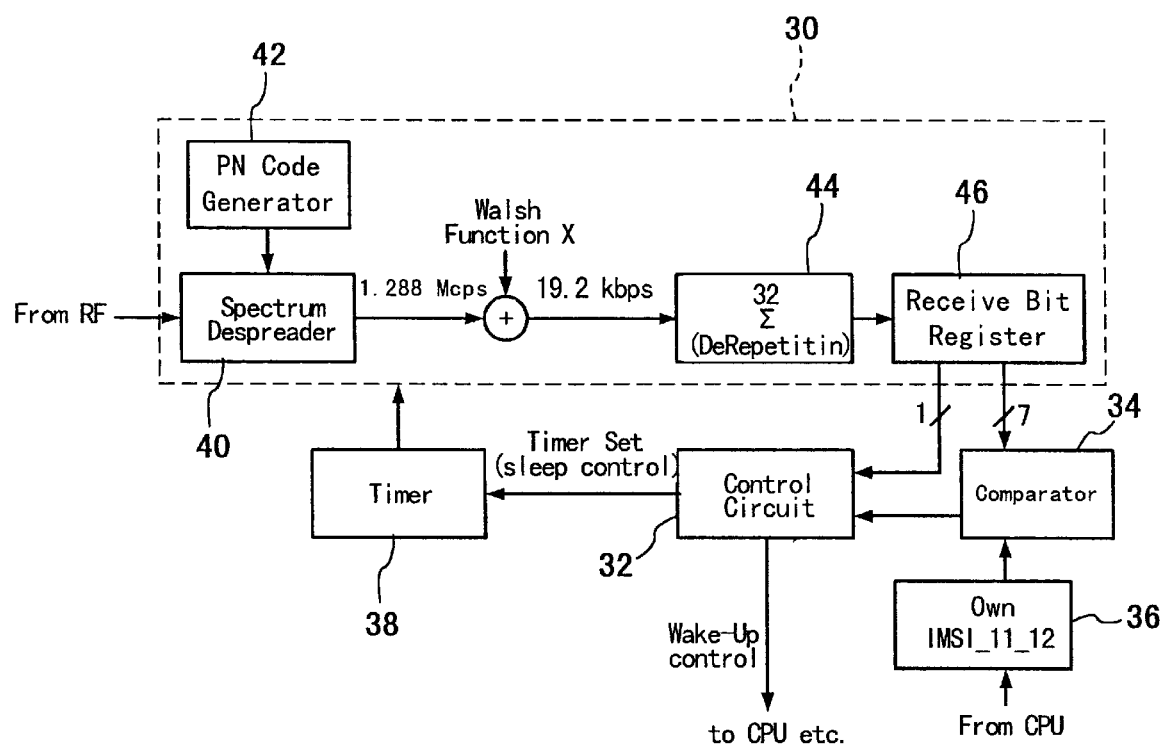
FIG. 7 is a block diagram illustrating a CDMA receiver used in the fourth preferred embodiment.

FIG. 7 shows a CDMA receiver used in the fourth preferred embodiment. The CDMA receiver includes a baseband-processing unit 30, a control circuit 32, a comparator 34, and a timer 38. The control circuit 32 is connected to the baseband-processing unit 30, the comparator 34, the time 38 and a CPU (not shown) to perform total control of the receiver. The comparator 34 is designed to receive its own IMSI_11_12 from the CPU and compares the own IMSI_11_12 to IMSI data transmitted from the base station. The baseband-processing unit 30 includes a spectrum despreader 40, a PN code generator 42, a derepetition circuit 44 and a receive bit register 46.

The baseband-processing unit 30 monitors the page message notice channel (CH=X) only during the period of 13.3 ms in which the page message notice signal is being transmitted. The spectrum despreader 40 despreads the page message notice signal by a PN code. The despread signal is again despread by Walsh function X to generate a signal of 19.2 kbps. The 19.2 kbps signal is integrated by 32 times to reproduce the original bit (notice information bit) of 600 bps. The receive-bit register 46 stores the reproduced notice information of eight bits. The receive-bit register 46 supplies one bit for Field 1 to the control circuit 32 and the remaining seven bits for Field 2 to the comparator 34.

The control circuit 32 determines whether the bit for Field 1 is zero or one. The comparator 34 compares the seven bits for Field 2 to its own IMSI__11__12, supplied from the CPU. Based on the determination of Field 1 and the output of the comparator 34, the control circuit 32 controls the CPU and/or the timer 38. That is, the control circuit 32 decides which cases (1), (2) and (3) the notice information bit correspond to. When the notice information bit corresponds to one of the cases (2) and (3), the control circuit 32 wakes up the CPU for CDMA receiving operation. On the other hand, when the notice information bit corresponds to the case (1), the control circuit 32 does not wake up the CPU, etc., but performs SLEEP processing, such as setting the timer 38 to a predetermined value. The baseband-processing unit 30 is also controlled to be in SLEEP mode until the next notice information is transmitted.

According to the fourth preferred embodiment, the CPU in the mobile station performs the CDMA receiving operation for the assigned paging channel at a lower frequency than the third preferred embodiment. In most cases, even if a monitor-required message is included in the assigned time slot, the message is addressed to one mobile station out of a number of mobile stations. In other words, page messages addressed to two or more mobile stations are included in the assigned time slot at a very low frequency. That is, in most cases, only 1% of mobile station is required to wake up.

To improve the transmission quality, interleave processing may be performed in the base station, in the same manner as the second preferred embodiment.

What is claimed is:

1. A method of CDMA communication, in which page messages are transmitted over paging channels to mobile stations, comprising the steps of:

providing a page message notice channel that is different from the paging channels;

generating a page message notice signal indicating whether a monitor-required page message is included in an up-coming time slot, the up-coming time slot being transmitted certain slots later than the current time slot; and transmitting the page message notice signal over the page message notice channel., wherein the page message notice signal has a plurality of information bits for each paging channel, the plurality of information bits including a first information bit that indicates whether a monitor-required page message is included in the up-coming time slot addressed to at least one mobile station in a first ID class, and a second information bit that indicates whether a monitor-required page message is included in the up-coming time slot addressed to at least one mobile station in a second ID class, and wherein the first and second ID classes correspond to CLASS__0 and CLASS__1 for an IMSI (International Mobile Station Identity).

2. The method according to claim 1, further comprising the steps of:

monitoring the page message notice channel by each mobile station; and monitoring the paging channel by a particular one of the mobile stations only when the page message notice signal indicates that the up-coming time slot includes a monitor-required page message addressed to the particular one of the mobile stations.

3. The method according to claim 1, further comprising the step of: performing interleave processing on the page message notice signal.

4. A method of CDMA communication, in which page messages are transmitted over paging channels to mobile stations having ID numbers, comprising the steps of:

providing a page message notice channel that is different from the paging channels;

generating a page message notice signal based on at least a part of the ID numbers of the mobile stations, the page message notice signal indicating whether a monitor-required page message is included in an up-coming time slot, the up-coming time slot being transmitted certain slots later than the current time slot; and transmitting the page message notice signal over the page message notice channel, wherein the page message notice signal comprises a seven-bit code of IMSI__11__12 used for an IMSI (International Mobile Station Identity), and one information bit indicating whether a page message is included in the up-coming time slot assigned to at least one mobile station, wherein the one information bit is set to zero and the seven-bit code is set to a random number from "00" to "99" when no message is addressed to any of the mobile stations, to which the same paging channel is assigned, wherein the one information bit is set to one and the even-bit code is set to the ID number of the mobile station when a message is addressed to one of the mobile stations, to which the same paging channel is assigned, and wherein the one information bit is set to one and the seven-bit code is set to one of twenty-eight numbers that are different from "00" to "99" when messages are addressed to plural mobile stations to which the same paging channel is assigned.

5. The method according to claim 4, further comprising the step of:

performing interleave processing on the page message notice signal.

6. A CDMA communication system, comprising:

a base station which includes a page message generator that generates page messages for transmission over a plurality of paging channels, and a notice signal generator that generates a page message notice signal for transmission over a page message notice channel that is different from the paging channels, the page message notice signal indicating whether a monitor-required page message is included in an up-coming time slot transmitted N slots later than the current time slot; and mobile stations, each of which monitors the page message notice channel, and monitors a certain assigned paging channel only when the page message notice signal indicates that a monitor-required page message is included in the up-coming time slot assigned to the mobile station, wherein the page message notice signal has a plurality of information bits for each paging channel, the plurality of information bits including a first information bit that indicates whether a monitor-required page message is included in the up-coming time slot addressed to at least one mobile station in a first ID class, and a second information bit that indicates whether a monitor-required page message is included in the up-coming time slot addressed to at least one mobile station in a second ID class, and wherein the first and second ID classes correspond to CLASS_0 and CLASS_1 for an IMSI (International Mobile Station Identity).

7. The CDMA communication system according to claim 6, wherein each of the mobile stations comprises a CPU which processes the page message; a baseband-processing unit which processes the page message notice signal; and a control circuit which controls the CPU and the baseband-processing unit.

8. The CDMA communication system according to claim 7, wherein the control circuit controls the CPU so that the CPU does not wake up for operation until the page message notice signal indicates that a monitor-required page message is included in the up-coming time slot assigned to the mobile station.

9. The CDMA communication system according to claim 6, wherein the base station comprises an interleave circuit which interleaves the page message notice signal to be transmitted.

10. A CDMA communication system, comprising:

a base station which transmits page message over a plurality of paging channels, and a page message notice signal over a page message notice channel that is different from the paging channels, the page message notice signal indicating whether a monitor-required page message is included in an up-coming time slot transmitted N slots later than the current time slot; and mobile stations, each of which monitors the page message notice channel, and monitors a certain assigned paging channel only when the page message notice signal indicates that a monitor-required page message is included in the up-coming time slot assigned to the mobile station, wherein the mobile stations have ID numbers, and the base station generates the page message notice signal based on at least a part of the ID numbers of the mobile stations, wherein the page message notice signal comprises a seven-bit code of IMSI-11-12 used for an INMSI (International Mobile Station Identity), and one information bit indicating whether a page message is included in the up-coming time slot assigned to at least one mobile station, wherein the one information bit is set to zero and the seven-bit code is set to a random number from "00" to "99" when no message is addressed to any of the mobile stations, to which the same paging channel is assigned, wherein the one information bit is set to one and the seven-bit code is set to the ID number of the mobile station when a message is addressed to one of the mobile stations, to which the same paging channel is assigned, and wherein the one information bit is set to one and the seven-bit code is set to one of twenty-eight numbers that are different from "00" to "99" when messages are addressed to plural mobile stations to which the same paging channel is assigned.

11. The CDMA communication system according to claim 10, wherein the base station comprises an interleave circuit which interleaves the page message notice signal to be transmitted.

12. The CDMA communication system according to claim 10, wherein each of the mobile stations comprises:

a CPU which processes the page message;

a baseband-processing unit which processes the page message notice signal; and a control circuit which controls the CPU and the baseband-processing unit.

13. The CDMA communication system according to claim 12, wherein the control circuit controls the CPU so that the CPU does not wake up for operation until the page message notice signal indicates that a monitor-required page message is included in the up-coming time slot assigned to the mobile station.

14. A method of CDMA communication, in which page messages are transmitted over a paging channel to mobile stations which are assigned to the paging channel and which have ID numbers, comprising the steps of:

providing a page message notice channel that is different from the paging channels;

generating a page message notice signal indicating whether a monitor-required page message is included in an up-coming time slot, the up-coming time slot being transmitted at least one slot later than a current time slot, and transmitting the page message notice signal over the page message notice channel, wherein the page message notice signal comprises a seven-bit code and an information bit, and wherein the information bit is set to a value indicating whether the seven-bit code identifies the ID number of a particular mobile station to which a message is addressed if only one message is to be transmitted, or whether the seven-bit code specifies either that no messages are present for any of the mobile station or that messages are present for transmission to more than one of the mobile stations.

15. The method of claim 14, wherein the information bit is set to zero and the seven-bit code is set to a value in a first predetermined range if no messages are present for any of the mobile stations, the information bit is set to one and the seven-bit code is set to a value that identifies the particular mobile station if only one message is to be transmitted, and the information bit is set to one and the seven-bit code is set to a value in a second predetermined range if messages are present for transmission to more than one of the mobile stations.

16. The method of claim 15, wherein the first predetermined range is "99" or less and the second predetermined range is greater than "99".

* * * * *